(12) United States Patent
Lee et al.

(10) Patent No.: US 10,904,926 B2
(45) Date of Patent: *Jan. 26, 2021

(54) METHOD FOR OPERATING A FAST RANDOM ACCESS PROCEDURE IN A WIRELESS COMMUNICATION SYSTEM AND A DEVICE THEREFOR

(71) Applicant: LG Electronics Inc., Seoul (KR)

(72) Inventors: Sunyoung Lee, Seoul (KR); Seungjune Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/661,327

(22) Filed: Oct. 23, 2019

(65) Prior Publication Data
US 2020/0092918 A1 Mar. 19, 2020

Related U.S. Application Data

(63) Continuation of application No. 15/553,406, filed as application No. PCT/KR2016/002294 on Mar. 8, 2016, now Pat. No. 10,512,105.

(Continued)

(51) Int. Cl.
*H04W 74/08* (2009.01)
*H04W 72/04* (2009.01)
(Continued)

(52) U.S. Cl.
CPC ..... *H04W 74/0833* (2013.01); *H04W 72/042* (2013.01); *H04W 56/0045* (2013.01); *H04W 74/008* (2013.01); *H04W 76/10* (2018.02)

(58) Field of Classification Search
CPC ............ H04W 74/0853; H04W 74/00; H04W 74/008; H04W 74/08; H04W 72/042;
(Continued)

(56) References Cited

U.S. PATENT DOCUMENTS

| 2009/0201873 A1* | 8/2009 | Korhonen | H04W 74/008 370/329 |
| 2009/0239545 A1 | 9/2009 | Lee | H04W 74/002 455/450 |

(Continued)

FOREIGN PATENT DOCUMENTS

| CN | 101583196 A | 11/2009 |
| CN | 101646251 A | 2/2010 |

(Continued)

OTHER PUBLICATIONS

The Applicant(s) wish to make of record the references listed on the attached PTO/SB/08 form. The listed documents were previously cited in U.S. Appl. No. 15/553,406, filed Aug. 24, 2017, upon which Applicants rely for the benefits provided under 35 U.S.C. § 120. Accordingly, pursuant to 37 C.F.R. § 1.98(d), a each reference is not provided.

*Primary Examiner* — Warner Wong
(74) *Attorney, Agent, or Firm* — Dentons US LLP

(57) ABSTRACT

The present invention relates to a wireless communication system. More specifically, the present invention relates to a method and a device for operating fast random access procedure in a wireless communication system, the method comprising: transmitting a RAP including a first RAP ID to an e-NodeB; starting monitoring a Physical Downlink Control Channel PDCCH addressed by RA-RNTI during RAR window; receiving, from the eNB, an indicator including at least one RAP ID, wherein one of the at least one RAP ID matches to the first RAP ID; and stopping monitoring the PDCCH addressed by RA-RNTI upon reception of the indicator.

9 Claims, 17 Drawing Sheets

Related U.S. Application Data

(60) Provisional application No. 62/130,537, filed on Mar. 9, 2015.

(51) Int. Cl.
*H04W 74/00* (2009.01)
*H04W 56/00* (2009.01)
*H04W 76/10* (2018.01)

(58) Field of Classification Search
CPC ......... H04W 56/0045; H04W 52/0225; H04W 48/12; H04W 24/00; H04W 4/20; H04L 76/00; H04L 76/10; H04L 76/11; H04L 43/00
See application file for complete search history.

(56) References Cited

U.S. PATENT DOCUMENTS

| | | | |
|---|---|---|---|
| 2009/0262681 A1 | 10/2009 | Park | H04W 74/0841 370/328 |
| 2009/0316630 A1 | 12/2009 | Yamada | H04W 56/0005 370/328 |
| 2010/0002590 A1 | 1/2010 | Park | H04W 74/006 370/241 |
| 2010/0113051 A1* | 5/2010 | Du | H04W 74/002 455/450 |
| 2010/0202288 A1* | 8/2010 | Park | H04W 48/08 370/230 |
| 2010/0232363 A1 | 9/2010 | Hsu | |
| 2010/0232364 A1* | 9/2010 | Hsu | H04W 74/085 370/328 |
| 2010/0260136 A1* | 10/2010 | Fan | H04W 72/0453 370/330 |
| 2010/0272035 A1 | 10/2010 | Park | H04W 74/006 370/329 |
| 2010/0322096 A1* | 12/2010 | Hsu | H04W 74/002 370/252 |
| 2010/0322172 A1* | 12/2010 | Hsu | H04L 1/1867 370/329 |
| 2011/0014922 A1* | 1/2011 | Jen | H04W 74/002 455/450 |
| 2011/0116364 A1 | 5/2011 | Zhang | H04W 74/08 370/216 |
| 2011/0170503 A1* | 7/2011 | Chun | H04W 74/006 370/329 |
| 2011/0249641 A1 | 10/2011 | Kwon | H04W 74/0833 370/329 |
| 2011/0286411 A1* | 11/2011 | Kim | H04L 5/0007 370/329 |
| 2011/0317777 A1* | 12/2011 | Huang | H04W 74/004 375/259 |
| 2012/0300714 A1* | 11/2012 | Ng | H04W 56/0045 370/329 |
| 2012/0300715 A1* | 11/2012 | Pelletier | H04W 74/0891 370/329 |
| 2012/0314652 A1 | 12/2012 | Ahn | H04W 74/085 370/328 |
| 2013/0039324 A1 | 2/2013 | Kwon et al. | |
| 2013/0188612 A1* | 7/2013 | Dinan | H04W 56/0005 370/336 |
| 2013/0250882 A1* | 9/2013 | Dinan | H04L 5/0032 370/329 |
| 2013/0258882 A1* | 10/2013 | Dinan | H04L 27/2662 370/252 |
| 2013/0294310 A1 | 11/2013 | Yi et al. | |
| 2014/0112276 A1* | 4/2014 | Ahn | H04W 74/0833 370/329 |
| 2014/0126520 A1* | 5/2014 | Quan | H04W 74/0866 370/329 |
| 2014/0226601 A1* | 8/2014 | Park | H04W 74/0833 370/329 |
| 2014/0233538 A1 | 8/2014 | Zhang et al. | |
| 2014/0376486 A1* | 12/2014 | Lee | H04W 72/1278 370/329 |
| 2015/0003371 A1* | 1/2015 | Park | H04W 52/365 370/329 |
| 2015/0016352 A1* | 1/2015 | Bressanelli | H04W 74/0833 370/329 |
| 2015/0043505 A1 | 2/2015 | Kim et al. | |
| 2015/0103800 A1* | 4/2015 | Seo | H04W 48/10 370/330 |
| 2015/0117374 A1 | 4/2015 | Wu | H04W 74/0833 370/329 |
| 2015/0124746 A1* | 5/2015 | Wu | H04W 74/0833 370/329 |
| 2015/0131588 A1 | 5/2015 | Suzuki | H04W 74/006 370/329 |
| 2015/0245387 A1 | 8/2015 | Park | H04W 48/08 370/329 |
| 2015/0289292 A1 | 10/2015 | Sun | H04W 74/0833 370/329 |
| 2015/0296542 A1* | 10/2015 | Heo | H04W 74/0833 370/329 |
| 2015/0319773 A1* | 11/2015 | Lee | H04W 72/1278 370/330 |
| 2015/0326995 A1* | 11/2015 | Li | H04W 72/042 370/329 |
| 2015/0365976 A1* | 12/2015 | Lee | H04W 74/0833 455/422.1 |
| 2016/0014816 A1* | 1/2016 | Meyer | H04W 74/002 370/329 |
| 2016/0021694 A1* | 1/2016 | Pan | H04W 72/0413 370/329 |
| 2016/0081108 A1* | 3/2016 | Tseng | H04W 72/0493 370/329 |
| 2016/0094975 A1* | 3/2016 | Sheng | H04W 8/005 370/216 |
| 2016/0143059 A1 | 5/2016 | Jha | H04W 76/10 370/329 |
| 2016/0198497 A1* | 7/2016 | Yu | H04W 72/0446 370/330 |
| 2016/0302080 A1* | 10/2016 | Hwang | H04W 72/0473 |
| 2016/0302234 A1 | 10/2016 | Martinez Tarradell | H04W 74/006 |
| 2016/0323917 A1* | 11/2016 | Hwang | H04W 4/70 |
| 2016/0360422 A1* | 12/2016 | Zhang | H04W 4/80 |
| 2017/0019905 A1* | 1/2017 | Ko | H04W 72/08 |
| 2017/0034748 A1 | 2/2017 | Yoon | H04W 36/02 |
| 2017/0290064 A1 | 10/2017 | Liu | H04W 74/006 |
| 2018/0176961 A1 | 6/2018 | Babaei | H04W 74/0833 |
| 2019/0289544 A1* | 9/2019 | Yi | H04L 5/0053 |

FOREIGN PATENT DOCUMENTS

| | | |
|---|---|---|
| CN | 101904212 A | 12/2010 |
| EP | 2645792 A2 | 10/2013 |
| WO | 2013022451 A1 | 2/2013 |
| WO | 2014/088486 A1 | 6/2014 |

* cited by examiner

FIG. 3
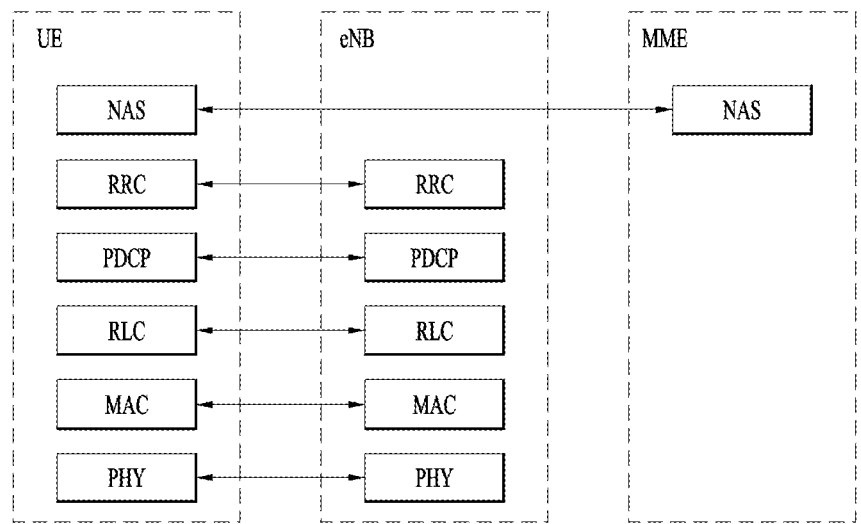
(a) Control-Plane Protocol Stack
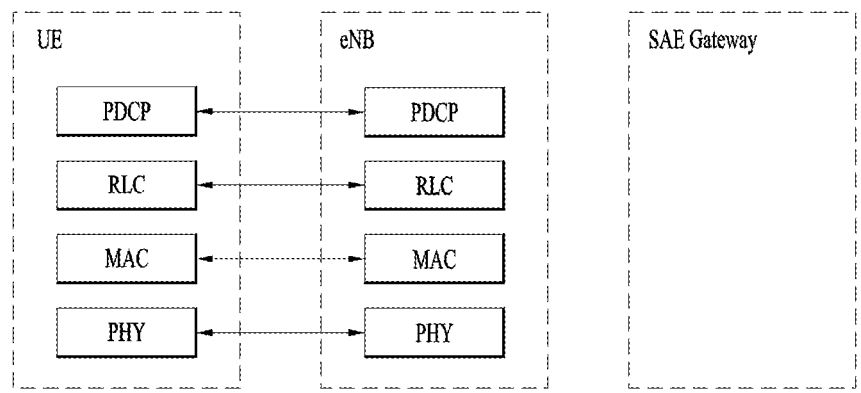
(b) User-Plane Protocol Stack

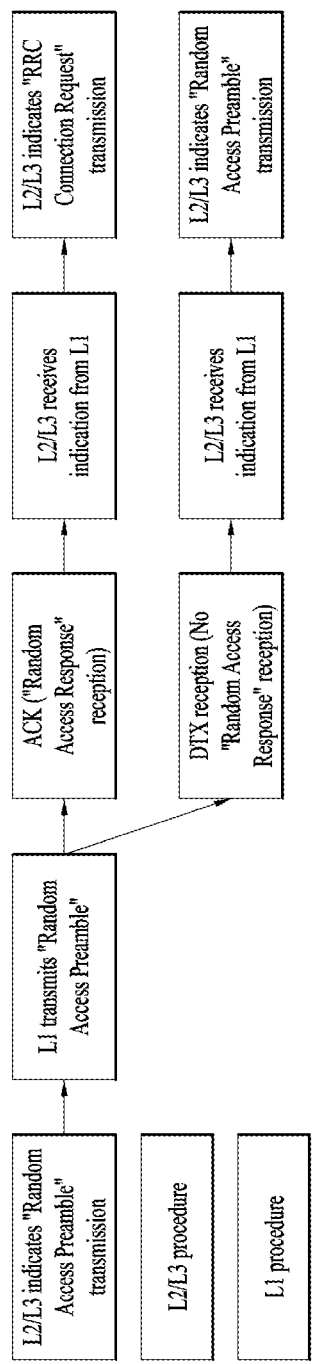

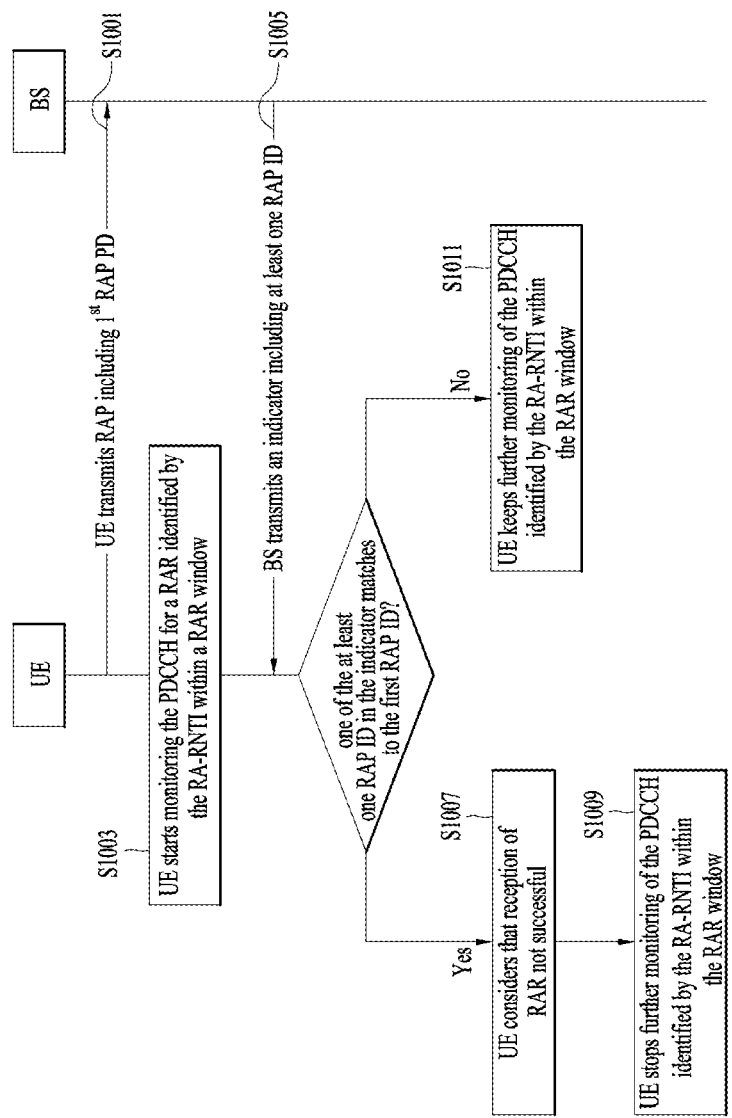

FIG. 14A

| $L_1$ | $L_2$ | $L_3$ | $L_4$ | $L_5$ | $L_6$ | $L_7$ | $L_8$ | Oct 1

⋮

| $L_{n-7}$ | $L_{n-6}$ | $L_{n-5}$ | $L_{n-4}$ | $L_{n-3}$ | $L_{n-2}$ | $L_{n-1}$ | $L_n$ | Oct n/8

METHOD FOR OPERATING A FAST RANDOM ACCESS PROCEDURE IN A WIRELESS COMMUNICATION SYSTEM AND A DEVICE THEREFOR

This application is a continuation of U.S. patent application Ser. No. 15/553,406, filed on Aug. 24, 2017, which is a National Stage Entry of International Application No. PCT/KR2016/002294, filed on Mar. 8, 2016, and claims the benefit of U.S. Provisional Application No. 62/130,537, filed on Mar. 9, 2015, all of which are incorporated by reference in their entirety herein.

TECHNICAL FIELD

The present invention relates to a wireless communication system and, more particularly, to a method for operating a fast random access procedure in a wireless communication system and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE

Technical Problem

An object of the present invention devised to solve the problem lies in a method and device for operating a fast random access procedure in a wireless communication system. The technical problems solved by the present invention are not limited to the above technical problems and those skilled in the art may understand other technical problems from the following description.

Technical Solution

The object of the present invention can be achieved by providing a method for User Equipment (UE) operating in a wireless communication system as set forth in the appended claims.

In another aspect of the present invention, provided herein is a communication apparatus as set forth in the appended claims.

It is to be understood that both the foregoing general description and the following detailed description of the present invention are exemplary and explanatory and are intended to provide further explanation of the invention as claimed.

Advantageous Effects

According to the present invention, operating a fast random access procedure can be useful for latency reduction or power saving. Specifically, when the eNB transmits an indicator which indicates the RAP that the eNB has not successfully decoded or received, the UE considers the RAR reception not successful and proceeds to the selection of a random access resource although the RAR window is not ended.

It will be appreciated by persons skilled in the art that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 3 is a diagram showing a control plane and a user plane of a radio interface protocol between a UE and an E-UTRAN based on a 3rd generation partnership project (3GPP) radio access network standard;

FIG. 8 is a view illustrating for interaction model between L1 and L2/3 for Random Access Procedure;

FIGS. 10 and 11 are conceptual diagrams for operating fast random access procedure in a wireless communication system according to embodiments of the present invention;

FIGS. 13A, 13B, 14A, and 14B are diagrams for a new MAC PDU according to embodiments of the present invention.

BEST MODE

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
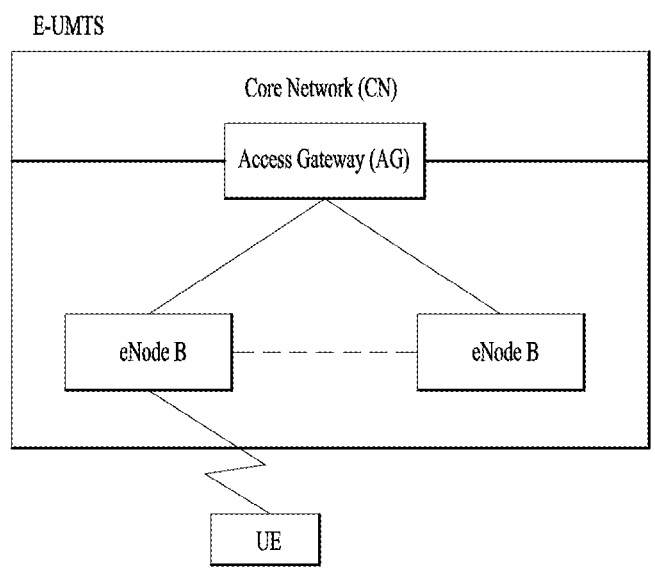
FIG. 1 is a diagram showing a network structure of an Evolved Universal Mobile Telecommunications System (E-UMTS) as an example of a wireless communication system.
Figure 2A:
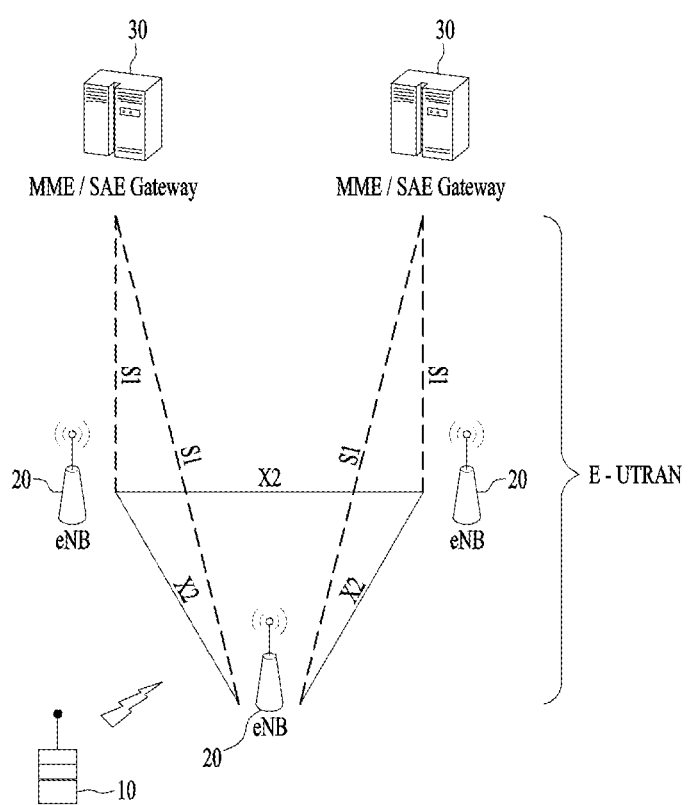
FIG. 2A is a block diagram illustrating network structure of an evolved universal mobile telecommunication system (E-UMTS)

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 2B:
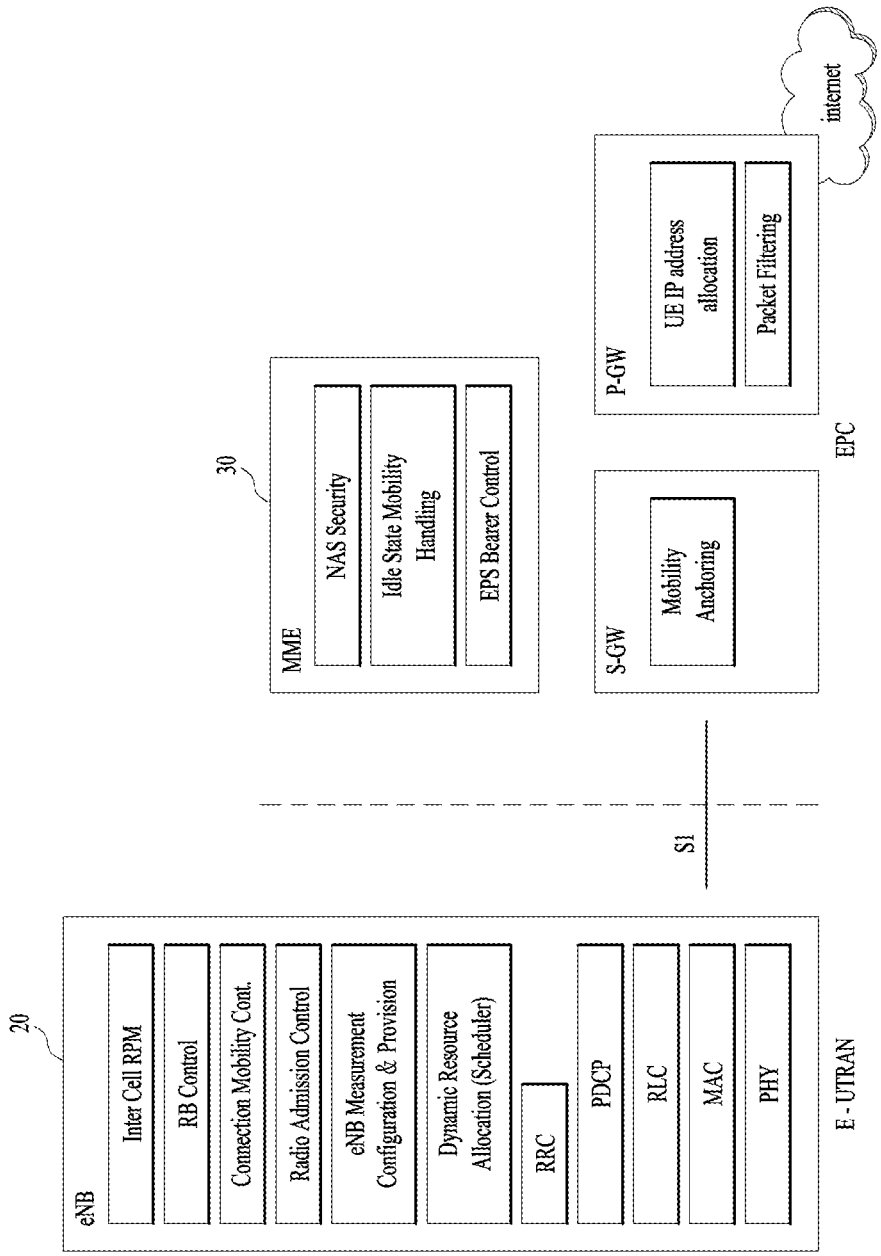
FIG. 2B is a block diagram depicting architecture of a typical E-UTRAN and a typical EPC.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
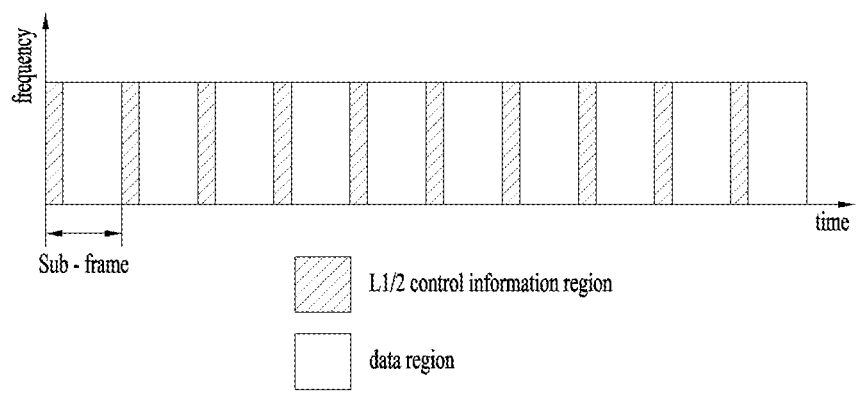
FIG. 4 is a view showing an example of a physical channel structure used in an E-UMTS system.

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Figure 5:
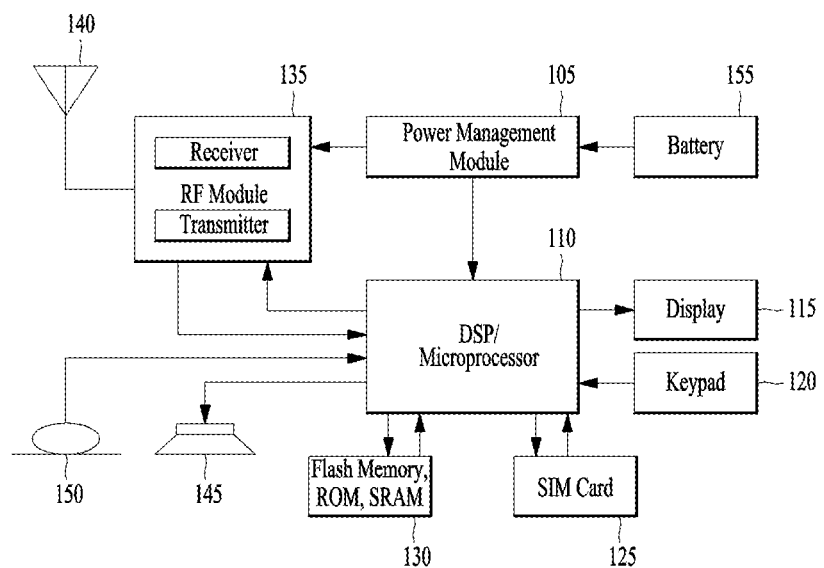
FIG. 5 is a block diagram of a communication apparatus according to an embodiment of the present invention.

FIG. 5 is a block diagram of a communication apparatus according to an embodiment of the present invention.

The apparatus shown in FIG. 5 can be a user equipment (UE) and/or eNB adapted to perform the above mechanism, but it can be any apparatus for performing the same operation.

As shown in FIG. 5, the apparatus may comprise a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 5 may represent a UE comprising a receiver (135) configured to receive a request message from a network, and a transmitter (135) configured to transmit the transmission or reception timing information to the network. These receiver and transmitter can constitute the transceiver (135). The UE further comprises a processor (110) connected to the transceiver (135: receiver and transmitter).

Also, FIG. 5 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

Recently, Proximity-based Service (ProSe) has been discussed in 3GPP. The ProSe enables different UEs to be connected (directly) each other (after appropriate procedure(s), such as authentication), through eNB only (but not further through Serving Gateway (SGW)/Packet Data Network Gateway (PDN-GW, PGW)), or through SGW/PGW. Thus, using the ProSe, device to device direct communication can be provided, and it is expected that every devices will be connected with ubiquitous connectivity. Direct communication between devices in a near distance can lessen the load of network. Recently, proximity-based social network services have come to public attention, and new kinds of proximity-based applications can be emerged and may create new business market and revenue. For the first step, public safety and critical communication are required in the market. Group communication is also one of key components in the public safety system. Required functionalities are: Discovery based on proximity, Direct path communication, and Management of group communications.

Use cases and scenarios are for example: i) Commercial/social use, ii) Network offloading, iii) Public Safety, iv) Integration of current infrastructure services, to assure the consistency of the user experience including reachability and mobility aspects, and v) Public Safety, in case of absence of EUTRAN coverage (subject to regional regulation and operator policy, and limited to specific public-safety designated frequency bands and terminals).

Similarly, Machine Type Communication (MTC) refers to a communication scheme between one or more machines and is also referred to as machine-to-machine (M2M) communication. Here, a machine refers to an entity which does not require direct human operation or intervention. For example, examples of the machine may include not only a device including a mobile communication module, such as a meter or a vending machine, but also a user equipment such as a smartphone which is capable of automatically accessing a network without operation/intervention of a user to perform communication. Various examples of such a machine are referred to as an MTC device or terminal in the present specification. That is, MTC refers to communication performed by one or more machines (that is, MTC devices) without human operation/intervention.

MTC may include communication between MTC devices and communication between an MTC device and an MTC application server. Examples of communication between an MTC device and an MTC application server include communication between a vending machine and a server, communication between a point of sale (POS) device and a server and an electric meter, and communication between a gas meter or a water meter and a server. MTC-based applications may include security, transportation, healthcare, etc.

In case of Machine Type Communication using the M2M devices, or ProSe communication using the D2D devices, power saving or latency reduction is one of important issues in this technology. Thus, to achieve the power saving or latency reduction, conventional Random Access procedure can be changed appropriately.

Figure 6:
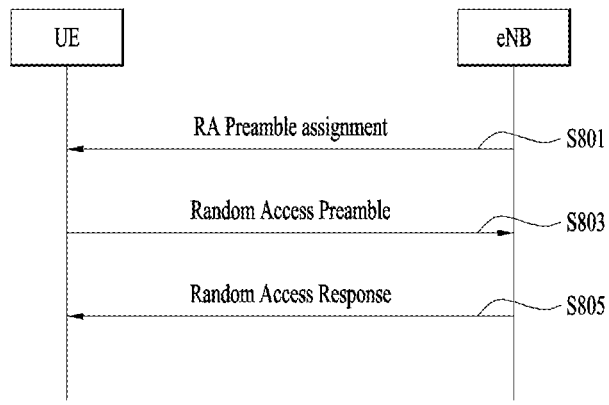
FIG. 6 is a diagram for an example method for performing a non-contention-based random access procedure.
Figure 7:
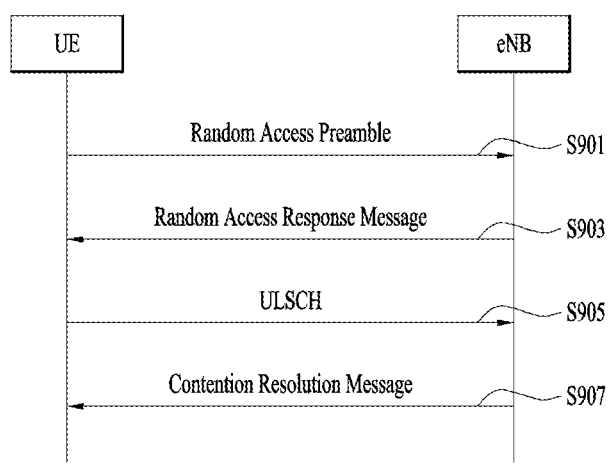
FIG. 7 is a diagram for an example method for performing a contention-based random access procedure.

FIGS. 6 and 7 are views illustrating an operating procedure of a terminal (UE) and a base station (eNB) in random access procedure. FIG. 6 is corresponding to non-contention based random access procedure and FIG. 7 is corresponding to contention based random access procedure.

The random access procedure takes two distinct forms. One is a contention based (applicable to first five events) random access procedure and the other one is a non-contention based (applicable to only handover, DL data arrival and positioning) random access procedure. The non-contention based random access procedure is also called as dedicated RACH process.

The random access procedure is performed for the following events related to the PCell: i) initial access from RRC_IDLE; ii) RRC Connection Re-establishment procedure; iii) Handover; iv) DL data arrival during RRC_CONNECTED requiring random access procedure (e.g. when UL synchronization status is "non-synchronized".), v) UL data arrival during RRC_CONNECTED requiring random access procedure (e.g. when UL synchronization status is "non-synchronized" or there are no PUCCH resources for SR available.), and vi) For positioning purpose during RRC_CONNECTED requiring random access procedure; (e.g. when timing advance is needed for UE positioning.)

The random access procedure is also performed on a SCell to establish time alignment for the corresponding sTAG. In DC, the random access procedure is also performed on at least PSCell upon SCG addition/modification, if instructed, or upon DL/UL data arrival during RRC_CONNECTED requiring random access procedure. The UE initiated random access procedure is performed only on PSCell for SCG.

Regarding FIG. 6, FIG. 6 shows the non-contention based random access procedure. As described above, a non-contention based random access procedure may be performed in a handover procedure and when the random access procedure is requested by a command of an eNode B. Even in these cases, a contention based random access procedure may be performed.

First, it is important that a specific random access preamble without the possibility of collision is received from the eNode B, for the non-contention based random access procedure.

The UE receives an assigned random access preamble (S601). Methods of receiving the random access preamble may include a method using HO command generated by target eNB and sent via source eNB for handover, a method using a Physical Downlink Control Channel (PDCCH) in case of DL data arrival or positioning, and PDCCH for initial UL time alignment for a sTAG.

The UE transmits the preamble to the eNode B after receiving the assigned random access preamble from the eNode B as described above (S603).

The UE attempts to receive a random access response within a random access response reception window indicated by the eNode B through handover command or system information after transmitting the random access preamble in step S603 (S605). More specifically, the random access response information may be transmitted in the form of a Medium Access Control (MAC) Packet Data Unit (PDU), and the MAC PDU may be transferred via a Physical Downlink Shared Channel (PDSCH). In addition, the UE preferably monitors the PDCCH in order to enable to the UE to properly receive the information transferred via the PDSCH. That is, the PDCCH may preferably include information about a UE that should receive the PDSCH, frequency and time information of radio resources of the PDSCH, a transfer format of the PDSCH, and the like. Here, if the PDCCH has been successfully received, the UE may appropriately receive the random access response transmitted on the PDSCH according to information of the PDCCH. The random access response may include a random access preamble identifier (e.g. Random Access-Radio Network Temporary Identifier (RA-RNTI)), an UL Grant indicating uplink radio resources, a temporary C-RNTI, a Time Advance Command (TAC), and the like.

As described above, the reason why the random access response includes the random access preamble identifier is because a single random access response may include random access response information of at least one UE and thus it is reported to which UE the UL Grant, the Temporary C-RNTI and the TAC are valid. In this step, it is assumed that the UE selects a random access preamble identifier matched to the random access preamble selected by the UE in step S603.

In the non-contention based random access procedure, it is determined that the random access procedure is normally performed, by receiving the random access response information, and the random access procedure may be finished.

FIG. 7 is a view illustrating an operating procedure of a UE and an eNB in a contention based random access procedure.

First, the UE may randomly select a single random access preamble from a set of random access preambles indicated through system information or a handover command, and select and transmit a Physical Random Access Channel (PRACH) capable of transmitting the random access preamble (S701).

There are two possible groups defined and one is optional. If both groups are configured the size of message 3 and the pathloss are used to determine which group a preamble is selected from. The group to which a preamble belongs provides an indication of the size of the message 3 and the radio conditions at the UE. The preamble group information along with the necessary thresholds is broadcast on system information.

A method of receiving random access response information is similar to the above-described non-contention based random access procedure. That is, the UE attempts to receive its own random access response within a random access response reception window indicated by the eNode B through the system information or the handover command, after the random access preamble is transmitted in step S701, and receives a Physical Downlink Shared Channel (PDSCH) using random access identifier information corresponding thereto (S703). Accordingly, the UE may receive a UL Grant, a Temporary C-RNTI, a TAC and the like.

If the UE has received the random access response valid for the UE, the UE may process all of the information included in the random access response. That is, the UE applies the TAC, and stores the temporary C-RNTI. In addition, data which will be transmitted in correspondence with the reception of the valid random access response may be stored in an Msg3 buffer.

The UE uses the received UL Grant so as to transmit the data (that is, the message 3) to the eNode B (S705). The message 3 should include a UE identifier. In the contention based random access procedure, the eNode B may not determine which UEs are performing the random access procedure, but later the UEs should be identified for contention resolution.

Here, two different schemes for including the UE identifier may be provided. A first scheme is to transmit the UE's cell identifier through an uplink transmission signal corresponding to the UL Grant if the UE has already received a valid cell identifier allocated by a corresponding cell prior to the random access procedure. Conversely, the second scheme is to transmit the UE's unique identifier (e.g., S-TMSI or random ID) if the UE has not received a valid cell identifier prior to the random access procedure. In general, the unique identifier is longer than the cell identifier. If the UE has transmitted data corresponding to the UL Grant, the UE starts a contention resolution (CR) timer.

After transmitting the data with its identifier through the UL Grant included in the random access response, the UE waits for an indication (instruction) from the eNode B for contention resolution. That is, the UE attempts to receive the PDCCH so as to receive a specific message (S707). Here, there are two schemes to receive the PDCCH. As described above, the UE attempts to receive the PDCCH using its own cell identifier if the message 3 transmitted in correspondence with the UL Grant is transmitted using the UE's cell identifier, and the UE attempts to receive the PDCCH using the temporary C-RNTI included in the random access response if the identifier is its unique identifier. Thereafter, in the former scheme, if the PDCCH is received through its own cell identifier before the contention resolution timer is expired, the UE determines that the random access procedure has been normally performed and completes the random access procedure. In the latter scheme, if the PDCCH is received through the temporary C-RNTI before the contention resolution timer has expired, the UE checks data transferred by the PDSCH indicated by the PDCCH. If the unique identifier of the UE is included in the data, the UE determines that the random access procedure has been normally performed and completes the random access procedure.

The Temporary C-RNTI is promoted to C-RNTI for a UE which detects RA success and does not already have a C-RNTI; it is dropped by others. A UE which detects RA success and already has a C-RNTI, resumes using its C-RNTI.

In the step of S703, Random Access Response reception is started after the UE transmits a Random Access Preamble. Once the Random Access Preamble is transmitted and regardless of the possible occurrence of a measurement gap, the MAC entity shall monitor the PDCCH of the SpCell for Random Access Response(s) identified by the RA-RNTI defined below, in the RA Response window which starts at the subframe that contains the end of the preamble transmission plus three subframes and has length ra-ResponseWindowSize subframes.

The RA-RNTI associated with the PRACH in which the Random Access Preamble is transmitted, is computed as:

$$RA\text{-}RNTI = 1 + t\_id + 10 * f\_id$$

Where $t\_id$ is the index of the first subframe of the specified PRACH ($0 \leq t\_id < 10$), and $f\_id$ is the index of the specified PRACH within that subframe, in ascending order of frequency domain ($0 \leq f\_id < 6$).

The MAC entity may stop monitoring for Random Access Response(s) after successful reception of a Random Access Response containing Random Access Preamble identifiers that matches the transmitted Random Access Preamble.

If no Random Access Response is received within the RA Response window, or if none of all received Random Access Responses contains a Random Access Preamble identifier corresponding to the transmitted Random Access Preamble, the Random Access Response reception is considered not successful.

When the Random Access Response reception is considered not successful, the MAC entity increments PREAMBLE_TRANSMISSION_COUNTER by 1 if the notification of power ramping suspension has not been received from lower layers.

If in this Random Access procedure, the Random Access Preamble was selected by MAC, the MAC entity selects a random backoff time according to a uniform distribution between 0 and the Backoff Parameter Value based on the backoff parameter, and delays the subsequent Random Access transmission by the backoff time. And the MAC entity proceeds to selection of a Random Access Resource. The Random Access Resource selection includes the following performance: i) selection of Random Access Preamble, ii) determination of the next available subframe containing PRACH, or iii) transmission of Random Access Preamble.

FIG. 8 is a view illustrating for interaction model between L1 and L2/3 for Random Access Procedure.

Random access procedure described above is modelled in FIG. 8 below from L1 and L2/3 interaction point of view. L2/L3 receives indication from L1 whether ACK is received or DTX is detected after indication of Random Access Preamble transmission to L1. L2/3 indicates L1 to transmit first scheduled UL transmission (RRC Connection Request in case of initial access) if necessary or Random Access Preamble based on the indication from L1.

FIGS. 9A to 9D are diagrams for MAC PDU including Random Access Response.

Figure 9A:
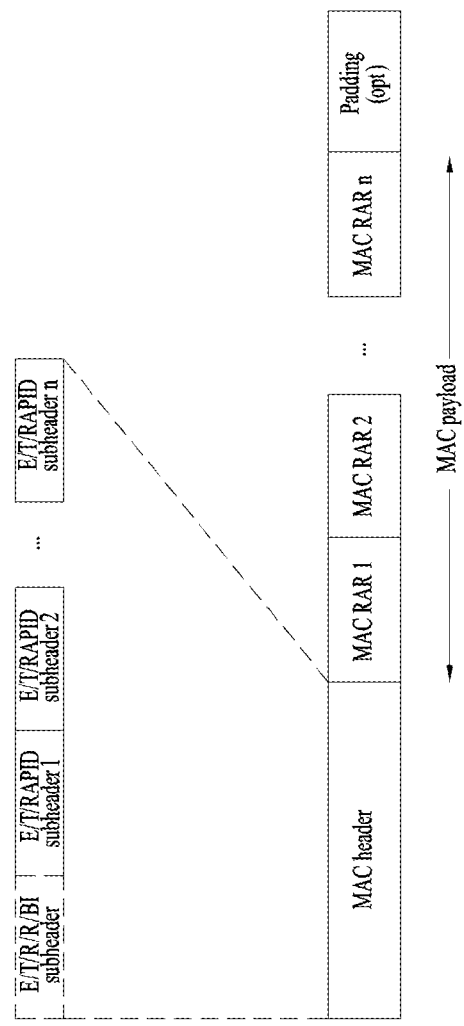
FIGS. 9A to 9D are diagrams for MAC PDU including Random Access Response.
Figure 9B:
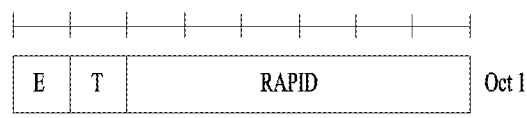

FIG. 9A is an example of MAC PDU consisting of a MAC header and MAC RARs. A MAC PDU consists of a MAC header and zero or more MAC Random Access Responses (MAC RAR) and optionally padding.

The MAC header is of variable size. A MAC PDU header consists of one or more MAC PDU subheaders; each subheader corresponding to a MAC RAR except for the Backoff Indicator subheader. If included, the Backoff Indicator subheader is only included once and is the first subheader included within the MAC PDU header.

Figure 9C:
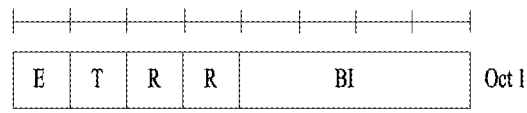

A MAC PDU subheader consists of the three header fields E/T/RAPID (as described in FIG. 9B) but for the Backoff Indicator subheader which consists of the five header field E/T/R/R/BI (as described in FIG. 9C).

Figure 9D:
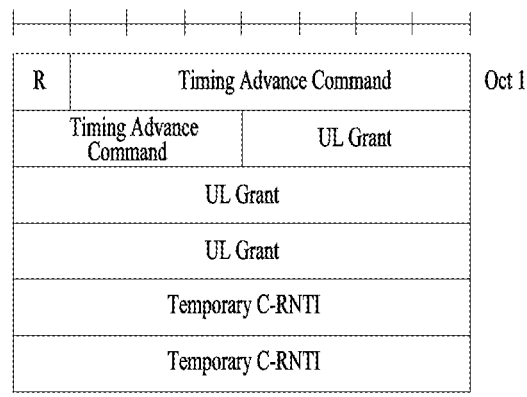

A MAC RAR consists of the four fields R/Timing Advance Command/UL Grant/Temporary C-RNTI (as described in FIG. 9D). Padding may occur after the last MAC RAR. Presence and length of padding is implicit based on TB size, size of MAC header and number of RARs.

The MAC header is of variable size and consists of the following fields:

E: The Extension field is a flag indicating if more fields are present in the MAC header or not. The E field is set to "1" to indicate at least another set of E/T/RAPID fields follows. The E field is set to "0" to indicate that a MAC RAR or padding starts at the next byte;

T: The Type field is a flag indicating whether the MAC subheader contains a Random Access ID or a Backoff Indicator. The T field is set to "0" to indicate the presence of a Backoff Indicator field in the subheader (BI). The T field is set to "1" to indicate the presence of a Random Access Preamble ID field in the subheader (RAPID);

R: Reserved bit, set to "0";

BI: The Backoff Indicator field identifies the overload condition in the cell. The size of the BI field is 4 bits;

RAPID: The Random Access Preamble IDentitfier field identifies the transmitted Random Access Preamble. The size of the RAPID field is 6 bits.

The MAC header and subheaders are octet aligned.

For random access (RA) procedure, the UE transmits a random access preamble (RAP) to the eNB and then the UE shall monitor the PDCCH addressed by RA-RNTI during Random Access Response (RAR) window. RAR window starts at the subframe that contains the end of the RAP transmission plus three subframes and has length ra-ResponseWindowSize subframes.

During the RAR window, the UE shall monitor the PDCCH in order to receive RAR which contains the RAP ID that the UE transmitted to the eNB. After successful reception of a RAR containing the transmitted RAP, the UE may stop monitoring the PDCCH addressed by RA-RNTI.

This implies that if the UE has not received a RAR containing the RAP ID corresponding to the transmitted RAP, the UE shall continue monitoring the PDCCH during RAR window because the eNB may transmit the RAR containing the transmitted RAP ID at any point in time during RAR window. However, in case the eNB has not successfully decoded or received the RAP that the UE transmitted, the UE will eventually cannot receive a RAR containing the transmitted RAP ID. This brings unnecessary monitoring of PDCCH from the UE point of view and delays additional transmission of RAP and whole RA procedure accordingly.

Currently, there is no method for a UE to predict that the eNB will not transmit the RAR containing the transmitted RAP ID during RAR window so that the UE is not going to receive the RAR containing the transmitted RAP ID during RAR window. If the UE can predict whether the UE would receive RAR containing the transmitted RAP ID or not during RAR window, the UE can perform RA procedure in a faster and more efficient manner.

FIG. 10 is a conceptual diagram for operating fast random access procedure in a wireless communication system according to embodiments of the present invention.

In this invention, after a UE transmits a random access preamble (RAP), it is proposed that the UE stops monitoring PDCCH addressed by RA-RNTI during Random Access Response (RAR) window if the UE receives an indicator from the eNB which indicates that the transmitted RAP was not successfully decoded or received by the eNB. In detail, the eNB transmits an indicator which indicates the RAP that the eNB has not successfully decoded or received. Upon reception of the indicator, the UE considers the RAR reception not successful and proceeds to the selection of a random access resource although the RAR window is not ended.

A UE transmits a random access preamble (RAP) to an eNB and computes the RA-RNTI based on the PRACH resource in which the RAP is transmitted (S1001). The UE starts monitoring the PDCCH for a RAR identified by the RA-RNTI within a RAR window (S1003).

The eNB receives at least one RAP from at least one UE associated with the RA-RNTI. In this case, the eNB transmits an indicator which indicates at least one RAP that the eNB has not successfully decoded or received associated with the RA-RNTI.

Preferably, the indicator indicates the concerned RAP by including: i) the RAP ID of the concerned RAP; or ii) bitmaps of RAP IDs, which is set to, e.g., "1", for the concerned RAP.

Preferably, the indicator is identified by RA-RNTI. The indicator is transmitted via MAC signaling, where the MAC signaling can be i) MAC Control Element, ii) MAC Subheader, or iii) MAC RAR.

Within the RAR window, when the UE receives an indicator identified by the RA-RNTI which indicates at least one RAP that the eNB does not successfully decoded or received (S1005), the UE considers that reception of RAR not successful (S1007)

For example, if one of the at least one RAPs indicated by the indication matches to the RAP that the UE transmitted associated with the RA-RNTI, the UE considers that reception of RAR not successful, and the UE stops further monitoring of the PDCCH identified by the RA-RNTI within the RAR window (S1009). The UE proceeds to the selection of a Random Access Resource regardless of whether RAR window is ended or not, where Random Access Resource selection includes, e.g., selection of RAP, determination of the next available subframe containing PRACH, transmission of RAP.

Else if none of the at least one RAP IDs indicated by the indication matches to the RAP ID of the transmitted RAP, the UE does not stop monitoring the PDCCH identified by the RA-RNTI within the RAR window. I.e., the UE keeps further monitoring of the PDCCH identified by the RA-RNTI within the RAR window (S1011).

Figure 11:
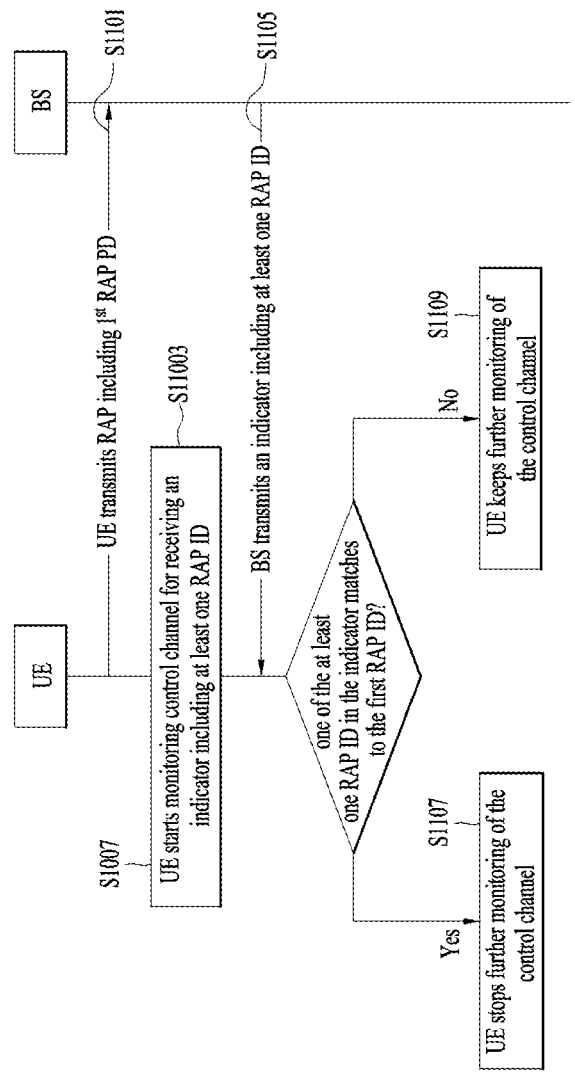

FIG. 11 is a conceptual diagram for operating fast random access procedure in a wireless communication system according to embodiments of the present invention.

In case of FIG. 11, it can be applied for Machine Type communication or ProSe communication to achieve power saving or latency reduction.

When a UE transmits a Random Access Preamble (RAP) including a first RAP identifier (ID) to a peer device (S1101), the UE monitors a control channel for receiving an indicator including at least one RAP ID (S1103). The peer device indicates that RAP is not successfully decoded or received associated with the RA-RNTI in order not to perform needless RA procedure. When the UE receives the indicator including at least one RAP ID from the peer device (S1105), the UE stops monitoring the control channel upon reception of the indicator (S1107).

Preferably, the indicator indicates the concerned RAP by including: i) the RAP ID of the concerned RAP; or ii) bitmaps of RAP IDs, which is set to, e.g., "1", for the concerned RAP.

Preferably, the indicator is identified by RA-RNTI. The indicator is transmitted via MAC signaling, where the MAC signaling can be i) MAC Control Element, ii) MAC Subheader, or iii) MAC RAR.

When the UE receives an indicator identified by the RA-RNTI which indicates at least one RAP that the peer device does not successfully decoded or received, the UE considers that reception of RAR not successful. At this time, the UE stops monitoring the control channel upon reception of the indicator.

Else if none of the at least one RAP IDs indicated by the indication matches to the RAP ID of the transmitted RAP, the UE does not stop monitoring the control channel identified by the RA-RNTI (S1109). I.e., the UE keeps further monitoring of the control channel identified by the RA-RNTI within the RAR window.

Figure 12:
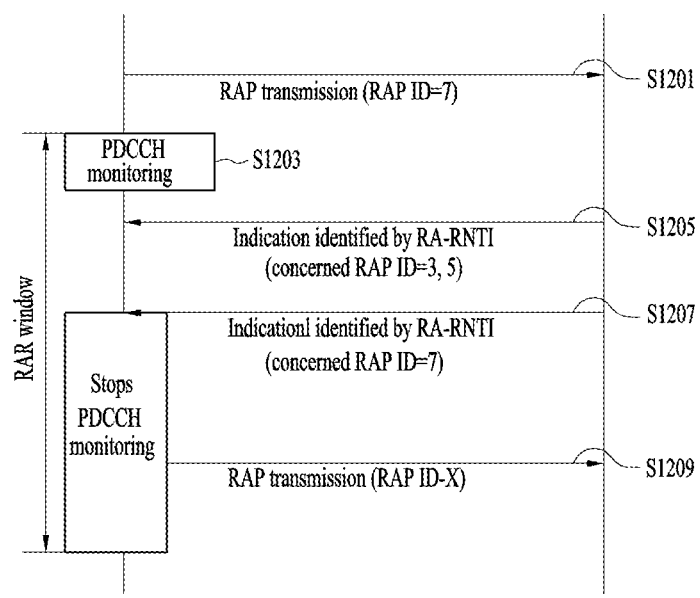
FIG. 12 is an example scenario for operating fast random access procedure in a wireless communication system according to embodiments of the present invention.

FIG. 12 is an example scenario for operating fast random access procedure in a wireless communication system according to embodiments of the present invention.

The UE transmits a RAP with RAP ID=7 and computes RA-RNTI (S1201). The UE shall monitor the PDCCH for RAR(s) identified by the RA-RNTI within the RAR window which starts at the subframe that contains the end of the RAP transmission plus three subframes (S1203).

Within the RAR window, the UE receives an Indication via MAC signal which indicates the RAP that the eNB has not successfully decoded or received. The UE checks whether RAPID=7 is indicated in the received Indication.

As RAPID=7 is not indicated in the received Indication, the UE keeps monitoring the PDCCH for RAR (S1205).

Meanwhile, as RAPID=7 is indicated in the received Indication, the UE considers that reception of RAR not successful and stops monitoring the PDCCH for RAR (S1207).

Further, the UE proceeds to Random Access Resource selection. The UE determines the next available subframe containing PRACH and transmits the RAP even within the RAR window. And then, the UE transmits the RAP even though the RAR window is not ended (S1209).

FIGS. 13A, 13B, 14A, and 14B are diagrams for a new MAC PDU according to embodiments of the present invention.

The indicator includes at least one of RAP ID so that the indicator indicates at least one RAP that the eNB has not successfully decoded or received associated with the RA-RNTI.

The indicator indicates the concerned RAP by including: i) the RAP ID of the concerned RAP (FIG. 13A); or ii) bitmaps of RAP IDs, which is set to, e.g., "1", for the concerned RAP (FIG. 14A).

Figure 13A:
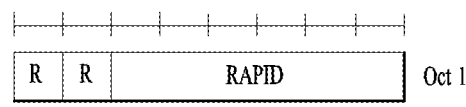
Figure 13B:
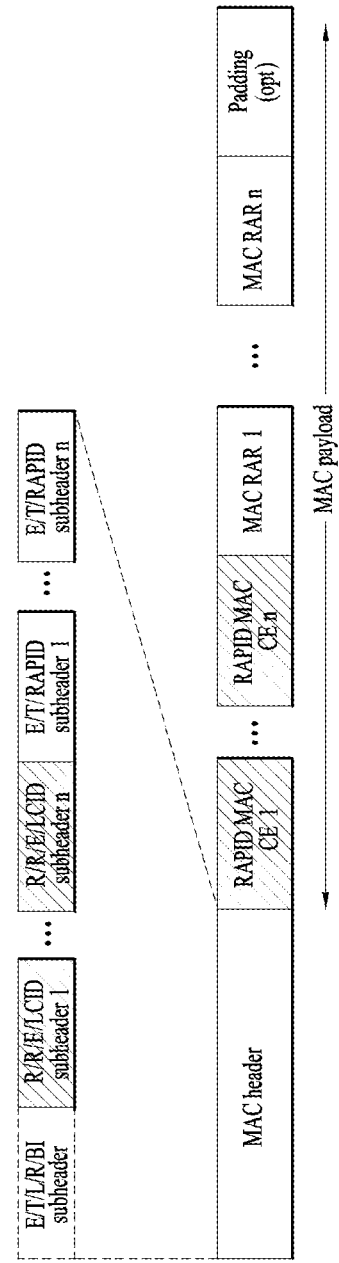
Figure 13C:
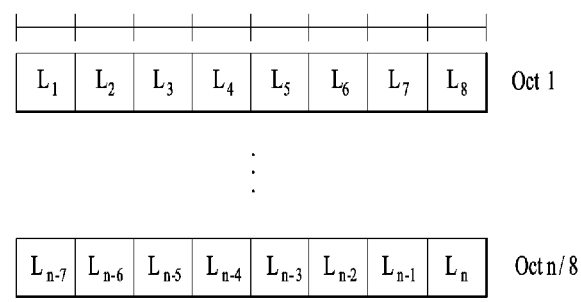
Figure 13D:
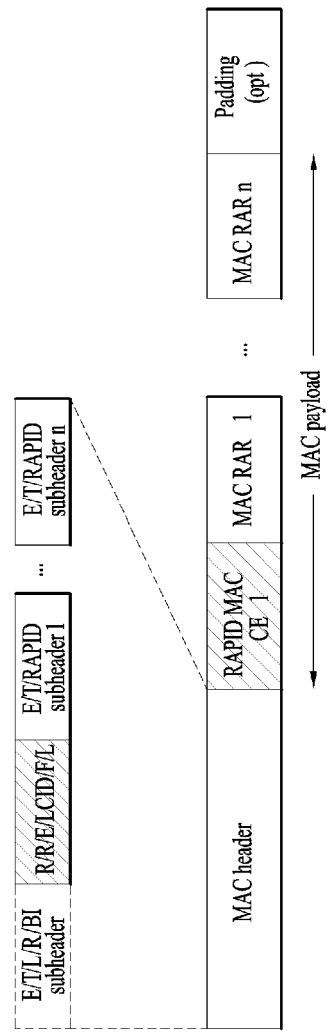

FIG. 13A is a RAPID MAC CE including only one RAP ID and FIG. 13B is an example of MAC PDU consisting of a MAC header, RAPID MAC CEs, and MAC RARs. In RAPID MAC CE of FIG. 13A, only one of the concerned RAP is indicated by including the corresponding RAP ID. An LCID is allocated for this RAPID MAC CE. By using the above RAPID MAC CE, an example of MAC PDU addressed by a RA-RNTI containing MAC header, RAP ID MAC CEs, and MAC RARs are shown as FIG. 13B.

Figure 14B:
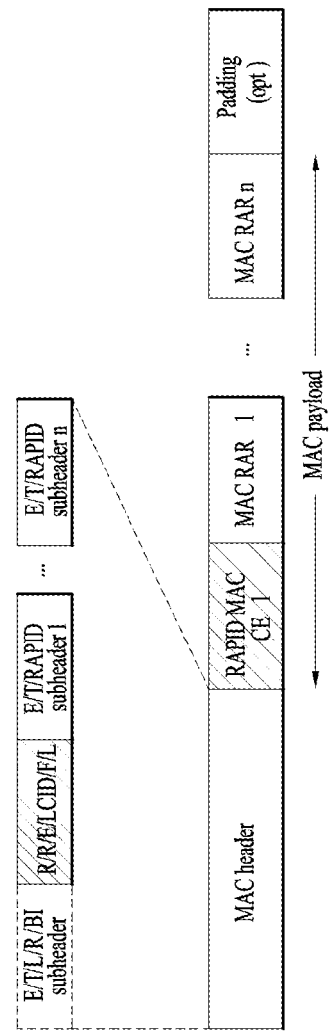

FIG. 14A is a RAPID MAC CE including multiple RAPs by using bitmap, and FIG. 14B is an example of MAC PDU consisting of a MAC header, RAPID MAC CE, and MAC RARs.

In RAPID MAC CE of FIG. 14A, multiple concerned RAPs are indicated by including the corresponding RAP IDs. For example, Li field is set to 1 for the concerned RAP with RAP ID=i. An LCID is allocated for this RAPID MAC CE.

By using the above RAP ID MAC CE, an example of MAC PDU addressed by a RA-RNTI containing MAC header, RAP ID MAC CEs, and MAC RARs are shown as FIG. 14B.

In summary, a conventional RA procedure considers that the Random Access Response reception is not successful if no Random Access Response is received within the RA Response window or if none of all received Random Access Responses contains a Random Access Preamble identifier corresponding to the transmitted Random Access Preamble.

However, according to this invention, if RAP identifier corresponding to the transmitted Random Access Preamble is indicated as not received by the eNB, the UE considers the Random Access Response reception is considered not successful, additionally.

By that unnecessary RAR reception procedures can be terminated early, it can get the effect of power saving and latency reduction. That is, if the UE can be sure that the RAR is not transmitted in the RAR window, the UE can stop unnecessary PDCCH monitoring early, and the UE can select and transmit a new RAP. This enables an efficient RA procedure.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from essential characteristics of the present invention. The above embodiments are therefore to be construed in all aspects as illustrative and not restrictive. The scope of the invention should be determined by the appended claims, not by the above description, and all changes coming within the meaning of the appended claims are intended to be embraced therein.

INDUSTRIAL APPLICABILITY

While the above-described method has been described centering on an example applied to the 3GPP LTE system, the present invention is applicable to a variety of wireless communication systems in addition to the 3GPP LTE system.

The invention claimed is:

1. A method for a User Equipment (UE) operating in a wireless communication system, the method comprising:
    transmitting a message including a first Random Access Preamble (RAP) identifier (ID) to a network;
    starting monitoring a Physical Downlink Control Channel (PDCCH) for a Random Access Response (RAR) during a time window for the RAR;
    receiving, from the network, an indicator including at least one RAP ID,
    wherein one of the at least one RAP ID matches the first RAP ID; and
    stopping monitoring the PDCCH for the RAR upon receiving the indicator,
    wherein the indicator is received based on the message not being successfully decoded or received by the network.

2. The method according to claim 1, wherein the indicator is received using a Radio Network Temporary identifier (RNTI) for the RAR.

3. The method according to claim 1, wherein the indicator is received using a Medium Access Control (MAC).

4. The method according to claim 1, further comprising:
    selecting a new Random Access Resource upon receiving the indicator.

5. The method according to claim 4, wherein selecting the new Random Access Resource includes selecting a new RAP, determining a next available subframe containing a Physical Random Access Channel (PRACH), or transmitting the new RAP.

6. The method according to claim 1, wherein based on that the UE does not receive the indicator, the UE continues monitoring the PDCCH for the RAR within the time window for the RAR.

7. The method according to claim 1, wherein the time window for the RAR starts at a subframe that contains end of the message transmission plus three subframes.

8. A User Equipment (UE) operating in a wireless communication system, the UE comprising:
    a receiver and transmitter; and
    a processor, operatively coupled to the receiver and transmitter,
    wherein the processor is configured to:
        control the transmitter to transmit a message including a first Random Access Preamble (RAP) identifier (ID) to a network;
        start monitoring of a Physical Downlink Control Channel (PDCCH) for a Random Access Response (RAR) during a time window for the RAR;
        control the receiver to receive, from the network, an indicator including at least one RAP ID,
        wherein one of the at least one RAP ID matches the first RAP ID; and
        stop monitoring the PDCCH for the RAR upon receiving the indicator,
        wherein the indicator is received based on the message not being successfully decoded or received by the network.

9. The method according to claim 1, wherein the indicator is received using a Medium Access Control (MAC) Protocol Data Unit (PDU), and
    wherein the MAC PDU further includes a RAR for another UE.

* * * * *